Sept. 22, 1964

C. H. MOORE 3,149,416

MULTIPLE FORGING METHOD

Filed Sept. 19, 1961

2 Sheets-Sheet 1

INVENTOR,
Charles H. Moore,
BY Dwight Bush
ATTORNEY

Sept. 22, 1964    C. H. MOORE    3,149,416
MULTIPLE FORGING METHOD
Filed Sept. 19, 1961    2 Sheets-Sheet 2
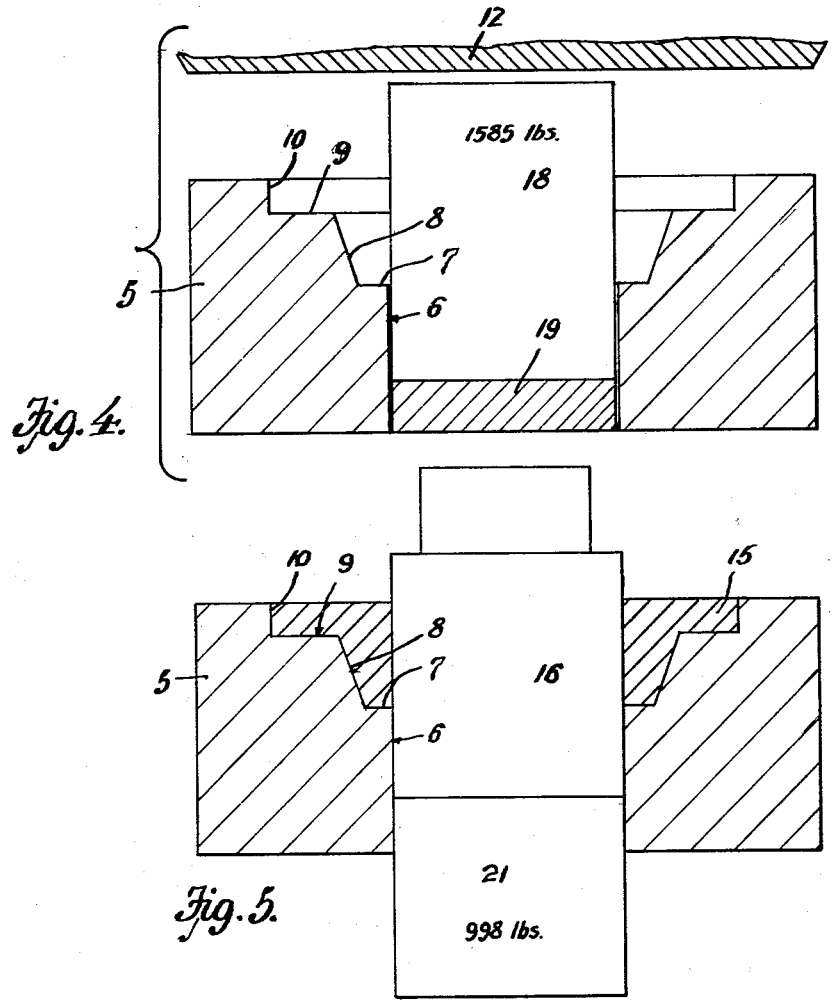
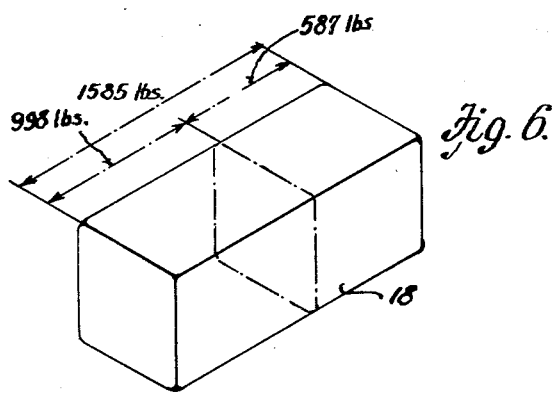
INVENTOR,
Charles H. Moore
BY
Douglas Brown
ATTORNEY.

United States Patent Office 3,149,416
Patented Sept. 22, 1964

3,149,416
MULTIPLE FORGING METHOD
Charles H. Moore, R.D. 4, West Chester, Pa.
Filed Sept. 19, 1961, Ser. No. 139,131
2 Claims. (Cl. 29—556)

The present invention is directed to a forging method for the production of ring-like bodies for use in connection with vessels, pipes or other containers usually subject to excessive temperatures and pressures, such as screwed flanges, socket welding flanges, slip-on welding flanges, lapped flanges and welding neck flanges, all of which have definite dimensions under prescribed standards and which are formed of various grades of steel through all the expensive alloys thereof. Present methods employed in the production of connections of this general character result in considerable loss of expensive metal as well as time, heat and labor, the present invention being directed to means whereby great economies in this direction are obtained. As an example, the present method of forging a welding neck flange 18" x 300 lbs. is to saw or burn off sufficient weight of a round cornered billet to obtain a weight of 998 lbs. This piece is then forged to a round of approximately 18" diameter in order to enter the prescribed die with sufficient metal protruding therefrom to take the form of the die when the platen of the press moves down into contact therewith. After this initial pressing operation, a punch of a diameter corresponding to the desired internal diameter of the welding flange will be centered on the press and forced downwardly through the hot solid mass in the die, carrying with it the central slug or core weighing approximately 411 lbs. This slug or core has little or no usefulness, and certainly cannot be used for another 18" x 300 lbs. welding neck flange because 998 lbs. is required as above set forth. The method here proposed is to utilize this slug in the production of an additional welding neck flange of the foregoing specifications and thus avoid the waste resulting from the production of such articles by present methods. In this description I will explain my method of multiple forging a pair of identical ring-like articles from a single steel billet, but it will be understood that multiples of two, three, four or more such articles may be produced by the same method, provided sufficient head room for the press permits.

Figure 1:
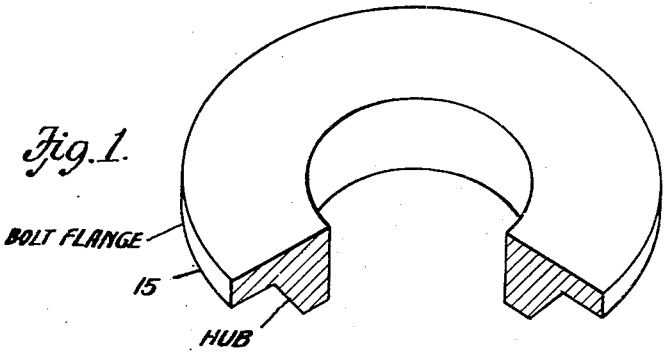
Figure 2:
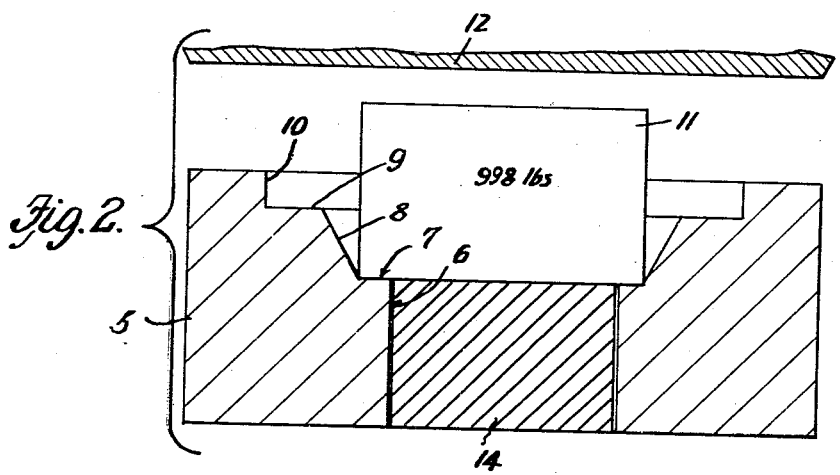
Figure 3:
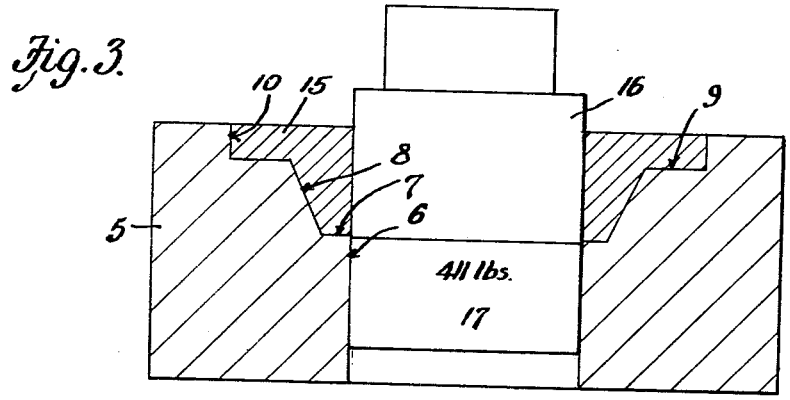

In carrying out my method, reference will be had to the drawings wherein:

FIG. 1 is a perspective view, partly in section, illustrating the construction of a well known welding neck flange, FIG. 2 is a sectional view showing a die of standard, or prior art, construction and illustrating the application thereto of a billet in the course of being operated upon by the platen or press head to take the shape, size and configuration of a welding neck flange die, FIG. 3 is a similar view showing the second step in the standard, or prior art, operation; that is, the forcing of a punch concentrically through the die to provide the inner circumference of the welding neck, FIG. 4 is a similar view showing the standard, or prior art, die having applied thereto a billet formed in accordance with my invention in the act of being operated upon to provide the initial welding neck, FIG. 5 is a similar view disclosing the second step of my process, that is, the lowering of the standard, or prior art, punch through the die to form the inner circumference of the neck and to automatically sever the core or slug therefrom to be utilized in the production of a second neck of the same specifications as the first, and FIG. 6 is a perspective view of the billet from which a pair of identical ring-like metal structures may be fabricated in accordance with my improved method.

As has been heretofore stated, the press and die are of standard well known construction, the ring die being indicated at 5, the same having a central bore or opening 6 corresponding to the internal diameter of the welding neck to be produced. This bore has an annular ledge or shoulder 7 a distance from the top of the die equal to the overall length the flange is to assume. The external diameter of this ledge or shoulder is joined by an outwardly and upwardly inclined wall 8 which is to define the hub of the welding flange, and the upper end of this wall is coincident with a platform 9 parallel to the upper end of the die, the outer end of which is joined by the annular wall 10 which determines the outer periphery of the bolt flange of the finished article. In the example given for the production of a welding neck flange of the specification 18" x 300 lbs., by the prior art method, a round cornered billet 11 weighing 998 lbs. is forged to a round of approximately 18" diameter in order to enter the die 5 in upstanding position with its lower edge supported by the ledge or shoulder 7 as well as the supporting block 14, and with its upper end protruding above the die as shown in FIG. 2. The platen or press head 12 is then lowered, forcing the metal of the billet down and out to take the shaped defined by the inclined wall 8, platform 9 and upstanding wall 10. When this is done, the metal will have assumed the shape shown in FIG. 3, the welding neck flange therein being indicated at 15. After this initial forging operation, the supporting block 14 is removed and a punch 16 of a diameter substantially equal to the bore 6 of the die is forced downwardly concentrically through the hot metal to provide the inner circular diameter of the finished welding neck flange, forcing therefrom the core or slug 17 which weighs approximately 411 lbs.

As previously stated the steps described immediately hereinbefore constitute the complete prior art operation of producing a single welding neck flange of the given specifications. According to the teachings of the present invention, the core or slug 17, heretofore useless in the production of any further welding neck flange of the specifications given, is recovered and without reheating utilized in the production of one or more additional welding neck flanges of those same specifications. As has been stated, I merely describe this method in producing a second complete welding neck, but it will be understood that the same method may be employed in the production of as many additional welding necks as the head room of the press will permit. In any case, the core or slug 17 resulting from the sequential steps recited hereinbefore is, according to the present invention, elevated to a position which is similar to the position of the initial body; the supporting block 14 repositioned within the bore 6 of the ring die 5; and the aforementioned forging steps repeated without the reheating of the core or slug. It will be understood by those skilled in the art that in order to permit this second forging operation the initial billet must be appropriately elongated.

In making two identical welding neck flanges from a single billet of metal I will utilize in the second flange the first slug weighing 411 lbs., which heretofore was wasted so far as immediate forging operations were concerned. Thus, I require for the first flange the same weight of metal as heretofore stated, that is, 998 lbs. but for the second flange I already have from the slug 17, 411 lbs., therefore I require additional weight of 998 lbs. minus 411 lbs., or 587 lbs. I therefore start with an elongated billet weighing 998 lbs. plus 587 lbs., totaling 1585 lbs. Starting with an elongated round cornered square billet of 1585 lbs., I forge it round approximately 16¼" diameter to enter the bore 6 of the die. Inasmuch as this billet 18 (FIG. 4) is considerably longer than would be the situation according to the prior art, a shallow block 19 is inserted in the bore 6 of the die, the thickness of this block being such that the upper end of the billet resting thereon will protrude above the die 5 a proper distance to provide metal for the first welding neck flange when the press head 12 descends. After this initial pressing operation, the block 19 is removed (FIG. 5) and the center punch 16 is lowered forming the internal diameter of the welding neck 15, and severing the slug or core 21 at the juncture of the bore 6 with the shoulder 7. This slug or core 21 resulting from the elongated billet weighs 998 lbs., the precise requirement for the production of a similar welding neck flange by proceeding with a second operation as earlier described. It will be seen, therefore, that in accordance with my method the billet may be elongated to produce two or more ring-like forgings such as welding neck flanges, depending upon the head room afforded by the press employed.

It will also be obvious that great saving in time, labor and expensive steel is obtained by my improved method, and in the final forging of the billet, however extended, there will always remain a slug or core weighing 411 lbs.

In the production of two welding neck flanges of the example here given by the present method, there would be required two separate and distinct billets each weighing 998 lbs., and the loss of two slugs each weighing 411 lbs. By the method I have developed, however, I can produce the two identical welding neck flanges at a saving in actual material of 411 lbs. If carbon steel is employed, at 6¢ per pound, there is a saving of $24.60. If the material employed is stainless steel at 70¢ per pound, there is saved $287.70. Like economies will be obtained where various other types and prices of steel are utilized. It is obvious that if head room of the press permits, three or more identical welding neck flanges of the specifications stated can be produced with the loss only of the final slug weighing 411 lbs.

Other economies are also involved, that is, a saving in sawing or burning off the round cornered square billets. For instance, in producing the flanges in multiples of two, only one burning or sawing operation is required as compared with the prior art method which would require two separate trimming operations. Economy also is worked in forging the square billets to rounds, and it is, of course, less expensive to heat a billet that is producing two pieces, rather than the heating and handling of two separate pieces from furnaces to presses.

The example here given is the production of a welding neck flange in common use of standard design, and while the invention is described as illustrating the production of this particular type of article, it will be understood that it is not limited thereto as other types of ring-like forged fittings or attachments may be equally as well and as economically produced as the type here described for illustrative purposes.

I claim:

1. The method of successively forging a plurality of ring-like structures of uniform shape, size and weight from a single solid elongated substantially cylindrical metallic billet which consists in supporting the heated billet within a ring die with metal protruding therefrom in sufficient volume to take the form of the ring die in succeeding multiples; applying a closure to the bottom of the central aperture in the ring die; pressing the protruding portion of the heated billet to conform to the entirety of the interior of the ring die including the centrally apertured portion thereof; removing the closure from the bottom of the central aperture in the ring die; passing a punch of equal diameter through the central aperture of the ring die, removing the ring-like structure thus formed from the ring die, elevating the slug formed by the punching step to a position similar to the position of the initial body, and repeating the aforementioned steps.

2. The method of claim 1 wherein the slug formed by the first punching step is subjected to the forging operation without reheating.

References Cited in the file of this patent

UNITED STATES PATENTS

| 1,119,775 | Blakeslee | Dec. 1, 1914 |
| 1,207,948 | Long | Dec. 12, 1916 |
| 1,456,597 | Hughes | May 29, 1923 |
| 1,929,802 | Brauchler | Oct. 10, 1933 |